US 6,568,729 B2

(12) United States Patent  
Bailey

(10) Patent No.: US 6,568,729 B2  
(45) Date of Patent: May 27, 2003

(54) FIBER SHOVEL

(76) Inventor: Karlus D. Bailey, 28436 Holly Run Dr., Carrsville, VA (US) 23315

(*) Notice: Subject to any disclaimer, the term of this patent is extended or adjusted under 35 U.S.C. 154(b) by 0 days.

(21) Appl. No.: 09/971,572

(22) Filed: Oct. 9, 2001

(65) Prior Publication Data

US 2003/0067181 A1 Apr. 10, 2003

(51) Int. Cl.$^7$ .................................................. A01B 1/20
(52) U.S. Cl. ........................... 294/49; 294/51; 294/55.5
(58) Field of Search .......................... 294/49, 51, 55, 294/55.5, 59; 15/236.08; 56/400.04, 400.11, 400.21; 30/169, 322; 7/114–116

(56) References Cited

U.S. PATENT DOCUMENTS

| 39,012 A | * | 6/1863 | Goodrem | 294/51 |
| 339,527 A | * | 4/1886 | Calef | 294/55.5 |
| 647,724 A | * | 4/1900 | McCoy | 56/400.13 |
| 674,117 A | | 5/1901 | Lefebvre | |
| 969,307 A | | 9/1910 | Sumerlin | |
| 1,435,061 A | | 11/1922 | Halsey | |
| 1,504,913 A | * | 8/1924 | Simoncelli | 294/51 |
| 1,771,207 A | * | 7/1930 | Coscioni | 294/55.5 |
| 2,429,120 A | | 10/1947 | Brandt | |
| 2,594,598 A | | 4/1952 | Timmins | |
| 3,226,149 A | | 12/1965 | McJohnson | |
| 5,417,044 A | * | 5/1995 | Russo | 294/55 |
| 5,791,706 A | | 8/1998 | Dolci | |
| 5,816,632 A | * | 10/1998 | Baldacci | 294/51 |

FOREIGN PATENT DOCUMENTS

| DE | 845867 | * | 8/1952 | ................... 294/51 |

* cited by examiner

Primary Examiner—Dean J. Kramer  
(74) Attorney, Agent, or Firm—Birch, Stewart, Kolasch & Birch, LLP

(57) ABSTRACT

According to principles of this invention, a fiber shovel has a scoop assembly including a scoop and elongated pointed members attached to a front of the scoop, with the pointed members including V-shaped teeth formed in sheet metal of the scoop. The V-shaped teeth have side edges extending at angles of over 50° with a plane perpendicular to an elongated handle of the fiber shovel with side edges adjacent to other V-shaped teeth intersecting the side edges thereof to form V-shaped troughs between the V-shaped teeth. Further, a length of each pointed member, from its outer tip to an adjacent trough is at least 5 inches and this length is not less than 30% nor more than 50% of the total length of the scoop in the direction of the elongated handle. In the preferred embodiment there are four pointed members, and in one embodiment the pointed members are formed by the V-shaped teeth with tines extending from outer tips thereof. In another embodiment, the pointed members are formed only by V-shaped teeth, with the teeth being reinforced by crimps formed in the sheet metal.

13 Claims, 3 Drawing Sheets

FIBER SHOVEL

BACKGROUND OF THE INVENTION

This invention relates generally to the art of shovels and pitchforks, and more particularly, to shovels that are particularly well suited for handling fibrous materials, such as mulch, grass clippings, pine straw (whether rotted or un-rotted) and the like.

It has been recognized that some fibrous materials are difficult to manipulate, either with a shovel or with a pitchfork. In this respect, small elements of fibrous materials, such as rotten portions of mulch, often fall between tines of pitchforks while longer fibrous elements thereof prevent leading edges of shovels from being inserted into piles of the fibrous materials. This is also true for combinations of fibrous and granular materials and for chip materials, such as chip mulch.

At least one prior-art mulch shovel has been suggested in U.S. Pat. No. 5,791,706 to Dolci, which basically describes a half shovel/half pitchfork. In this regard, the mulch shovel of Dolci includes a shovel scoop of reduced size with tines extending from a front end thereof. The front end of the scoop has a leading edge, which is approximately in a plane perpendicular to an elongated handle of the mulch shovel. The tines of this mulch shovel are to be inserted into mulch in the manner of a pitchfork, while the scoop then holds the mulch, which has been thusly engaged. Although this mulch shovel has some advantages, it does not work as well as it could. In this respect, when the leading edge of its scoop comes into contact with the mulch, after the mulch has been engaged by the tines, the scoop is prevented from being substantially further inserted into the mulch by its leading edge.

Thus, it is an object of this invention to provide a fiber shovel having a shovel-like scoop that can be relatively easily inserted into fibrous materials.

U.S. Pat. No. 3,226,149 to McJohnson describes a spading fork having tapered fingers. Although this spading fork probably can be easily inserted into a pile of fibrous materials, the tapered fingers are still separated to such an extent that small materials will fall between them and there is no substantial element for holding such small materials.

Therefore, it is another object of this invention to provide a tool for handling fibrous material, which can be inserted into piles of the fibrous material in somewhat the manner of a pitchfork, but which also includes a substantial shovel scoop for holding smaller pieces of materials mixed with the fibrous material.

Similarly, it is an object of this invention to provide a fiber shovel, which holds a substantial amount of small pieces of materials.

SUMMARY OF THE INVENTION

According to principles of this invention, a fiber shovel has a scoop assembly including elongated pointed members attached to a forward end edge of a scoop, with the pointed members including V-shaped teeth formed in sheet metal of the scoop, with the V-shaped teeth having side edges extending at angles greater than 50° to a plane perpendicular to an elongated handle of the fiber shovel, and with the side edges adjacent to other V-shaped teeth intersecting the side edges thereof to form V-shaped troughs between the V-shaped teeth. Further, a length of each pointed member, from its outer tip to an adjacent trough is at least 5 inches and this length is not less than 30% nor more than 67% of the total length of the scoop assembly in the direction of the elongated handle. In one preferred embodiment there are four pointed members, and in one embodiment the pointed members are formed by the V-shaped teeth and tines extending from pointed tips thereof. In another embodiment, the pointed members are formed only by V-shaped teeth, with the teeth being reinforced by crimps in the sheet metal.

BRIEF DESCRIPTION OF DRAWINGS

The foregoing and other objects, features and advantages of the invention will be apparent from the following more particular description of a preferred embodiment of the invention, as illustrated in the accompanying drawings in which reference characters refer to the same elements throughout the different views. The drawings are not necessarily to scale, emphasis instead being placed upon illustrating principles of the invention in a clear manner.

Each of FIGS. 1–3 is an isometric view of a respective different embodiment of this invention.

DETAILED DESCRIPTION OF THE INVENTION

Figure 1:
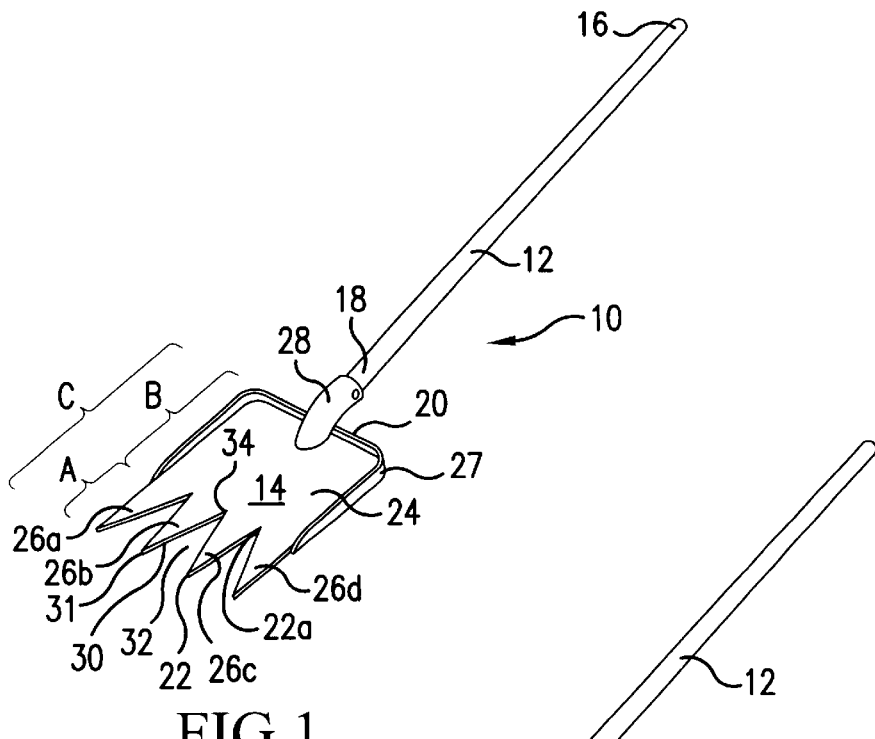

FIG. 1 shows a fiber shovel 10 of this invention basically including an elongated handle 12 and a shovel scoop assembly 14.

The elongated handle 12 has a handgrip end 16 and a scoop end 18 that is attached to the scoop assembly 14 by an attachment member 28.

The scoop assembly 14 has a back end 20, a forward-edge end 22, and defines a scoop 24 and four elongated pointed members 26a–d attached to a forward end 22a of the scoop 24.

The scoop 24 is formed of sheet metal that is approximately 15 gauge or approximately 0.075 inches thick when steel is used. It could also be formed of aluminum in which case it would probably be thicker. Other metals would also work. The sheet metal can be shaped to also form a surrounding raised wall 27 at sides and the back end 20 of the scoop 24. In addition to holding material on the scoop, the raised wall 27 also provides additional strength to the scoop assembly 14. The attachment member 28 attaches the scoop end 18 of the elongated handle 12 to the scoop assembly 14.

The elongated pointed members are made of the sheet metal, which forms the scoop 24 at the forward end 22a of the scoop 24. In this respect, each of the elongated pointed members 26a–d in the FIG. 1 embodiment is a V-shaped tooth having tapered side edges 30. The tapered side edges 30 extend at an angle of over 50° with a plane perpendicular to the elongated handle 12, with side edges 30 that are immediately adjacent to other V-shaped teeth intersecting the side edges of those adjacent V-shaped teeth to form V-shaped troughs 32 having substantially pointed apexes 34 at the forward end 22a of the scoop 24.

A length A of each pointed member from its outer tip 31 to the apex 34 of its adjacent troughs, in a direction of the elongated handle 12, is at least 5 inches. This length A of the pointed member is at least 30% (around ⅓) of a total length C of the scoop assembly 14 in the direction of the elongated handle. In this regard, the length of the scoop assembly 14 is the distance from the forward-edge end 22 (at the pointed outer tips 31) to the back end 20 in the direction of the handle 12. In one embodiment, the length A of the pointed members 26 is approximately the same as a length B of the scoop. Thus, in this case, the length A of the pointed members is approximately 50% of the length C of the scoop assembly 14. This has been found to be a particularly effective configuration for some purposes. In another embodiment, however, the length of the pointed members is approximately 67% of the length C of the scoop assembly 14. However, when the pointed members become longer than 50% of the scoop assembly 14, so that they are actually longer than the scoop 24, the fiber shovel 10 begins to lose some of its effectiveness for some uses because it can no longer hold as much small material. When the pointed members are greater than ⅔, or 67% of the total length C of the scoop, the fiber shovel begins to operate too much like a pitch fork, and therefore is not as particularly effective for small material.

Figure 2:
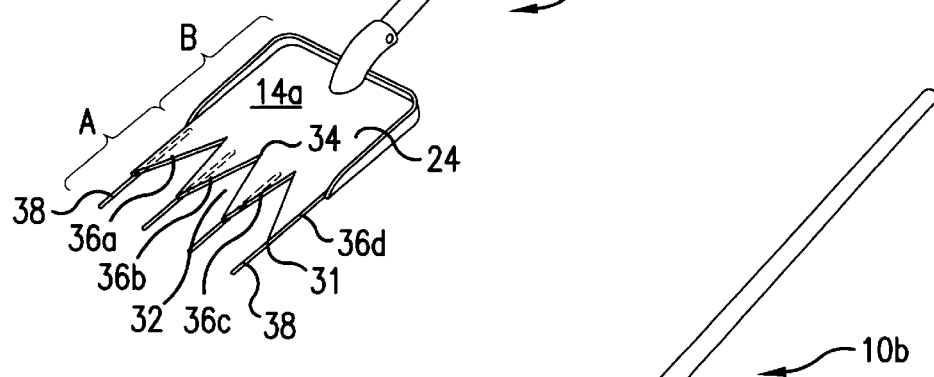

FIG. 2 shows another embodiment of a fiber shovel 10a of the invention, which differs from the fiber shovel 10 of FIG. 1 in that the elongated pointed members 36a–d, in addition to including V-shaped teeth, also include tines 38 welded, or otherwise attached, to the V-shaped teeth, aligned with the outer tips 31 thereof, and extending in the approximate direction of the handle 12. The V-shaped teeth again define V-shaped troughs 32 between them having pointed apexes 34. Since each of the elongated pointed members 36a–d comprises both a V-shaped tooth and a tine 38 extending beyond an apex of the V-shaped tooth, the elongated pointed members 36a–d of the FIG. 2 embodiment are quite a bit longer than the pointed members 26a–d of FIG. 1. As it can be seen in FIG. 2, the length A of the pointed members 36a–d are approximately the same as the length B of the scoop 24, thereby making the length of the pointed members about 50% of the total length of the scoop assembly 14a.

Figure 3:
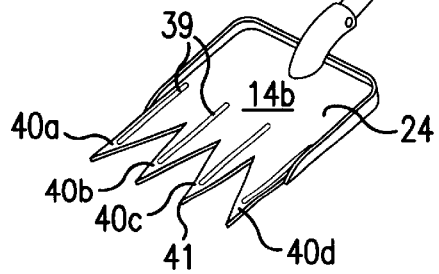

Looking at the embodiment of FIG. 3, in this embodiment a fiber shovel 10b is quite similar to the structure of the FIG. 1 embodiment with a difference being that each of elongated pointed members 40a–d includes an elongated crimp 39 in the sheet metal forming both the scoop 24 and the elongated pointed members 40a–d. These crimps 39 can be of various lengths, however, in FIG. 3 they are shown to extend from near the outer pointed tips of the pointed members 40a–d to partially into the scoop 24. The relative lengths of the pointed members 40a–d and the scoop 24 are the same as for the FIG. 1 embodiment. The crimps 39 provide added strength to the scoop assembly 14b. Again, the surrounding raised wall 27 also provides added support for the scoop assemblies in each of the embodiments FIGS. 1–3.

Figure 5:
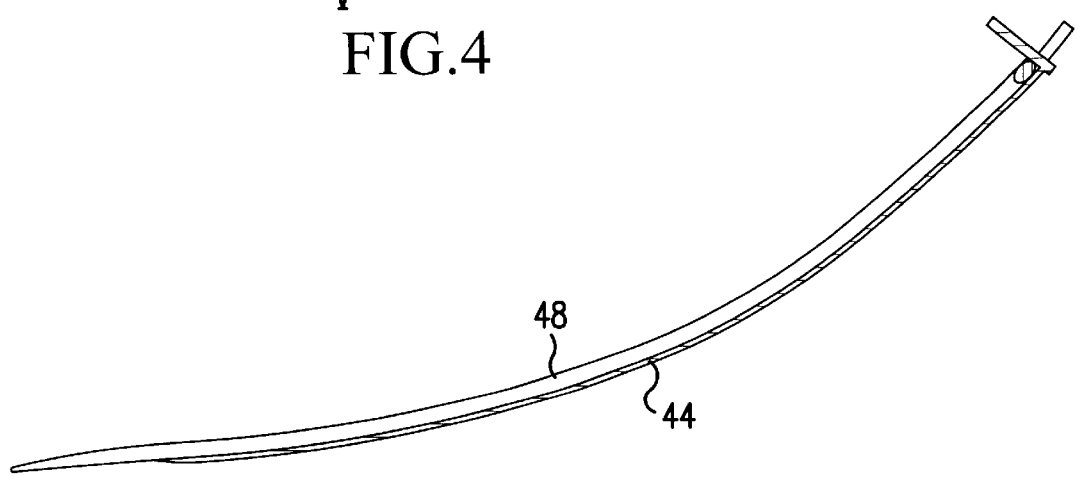
FIG. 5 is a cross-sectional view taken on line V—V in FIG. 4.
Figure 6:
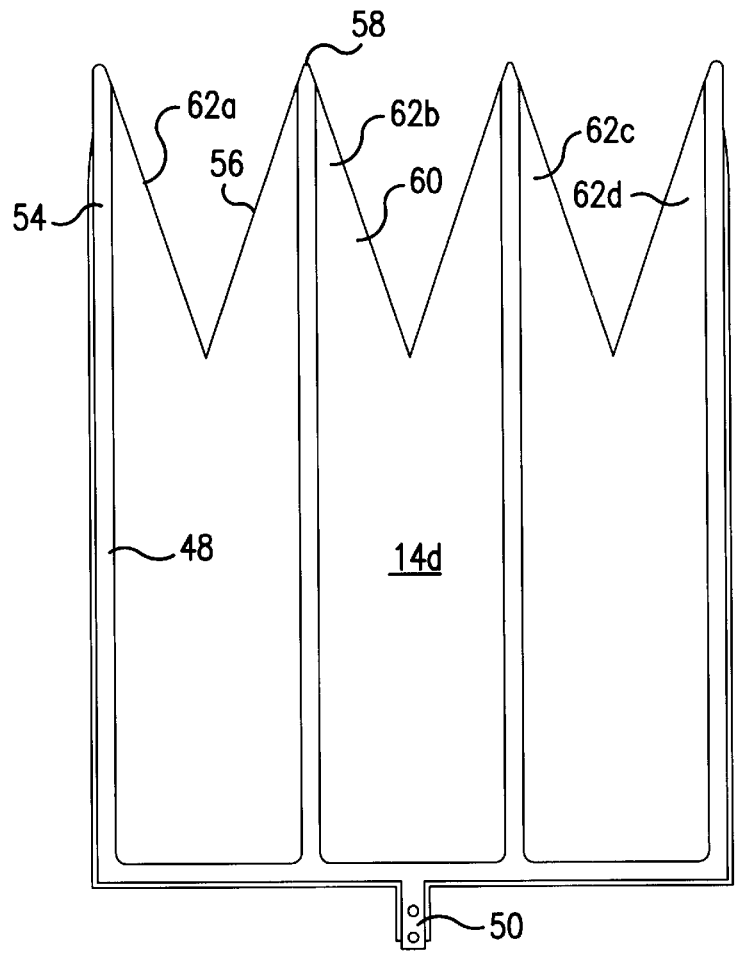
FIG. 6 is a plan view of a fifth embodiment of this invention.

FIGS. 5 and 6 depict an embodiment of this invention in which a pitchfork 42 has sheet metal 44 attached to it. The pitchfork 42 comprises a head 43 formed of a rear support 46 with tines 48 extending outwardly therefrom. A handle attachment 50 is fixedly attached to the rear support 46 of the head 43, in the manner of a normal pitchfork.

The sheet metal 44 and the pitchfork head 43 form a scoop assembly 14c including a scoop 24 and pointed members 52a–d. Again, a length A of the pointed members 52a–d is at least 30% of a total length C of the scoop assembly 14c, but it can be up to 50%, or equal to the length B of the scoop 24, or even up to 67% of the total length.

Figure 4:
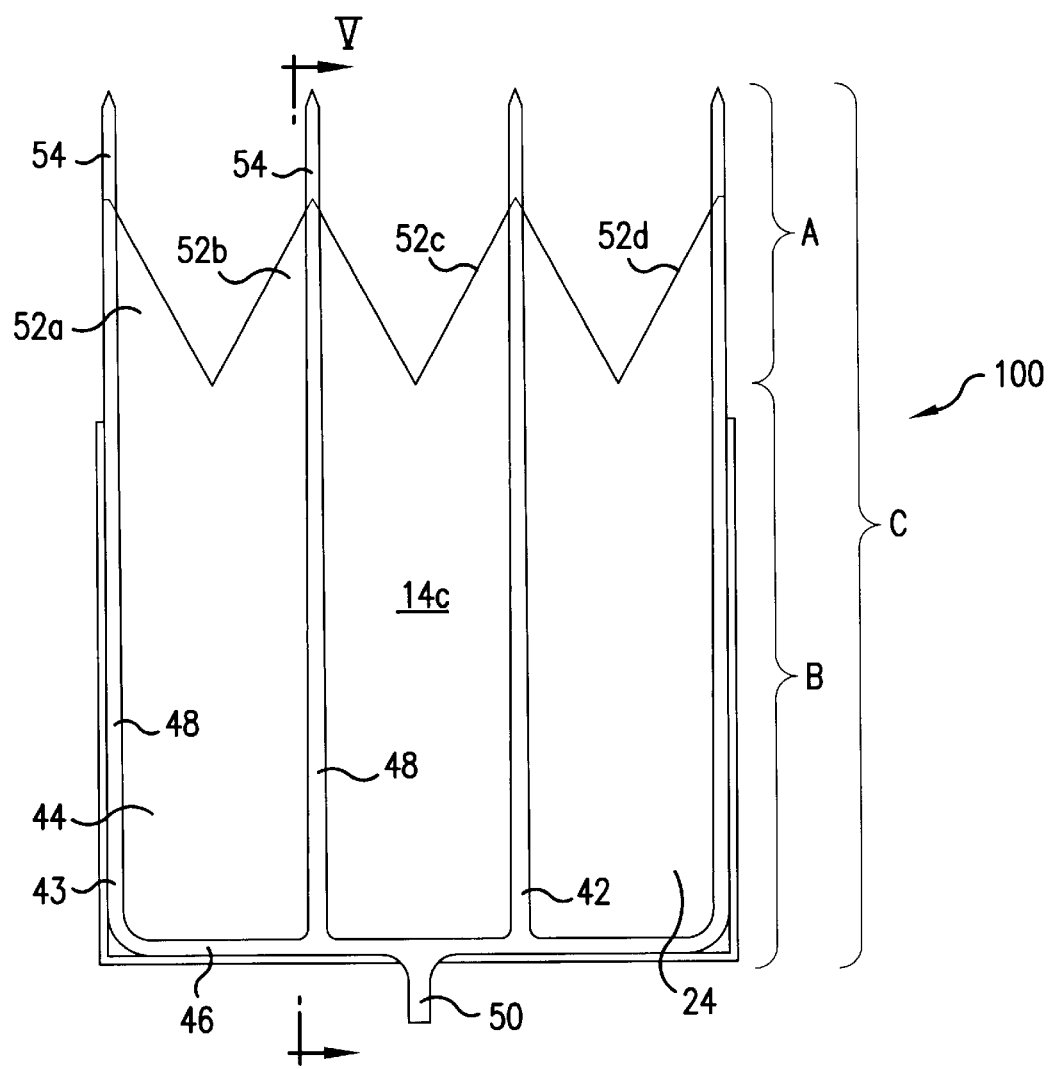
FIG. 4 is a plan view of yet another embodiment of this invention.

The tines 48 of most pitchforks 42 are bowed as shown in the cross section of FIG. 5, thus, the fiber shovel 10c of FIG. 4 is also bowed when seen from the side, as in FIG. 5. The sheet metal 44 can be attached to the tines 48 and the rear support 46 in various ways including welding and crimping. In this embodiment, outer end portions 54 of the tines 48 form outer end portions of the pointed members 52a–d while V-shaped teeth formed by the sheet metal 44 form inner portions of the pointed members 52a–d. However, again, the pointed members have a length greater than 5 inches and side edges of the V-shaped teeth extend at angles of over 50° with a plane perpendicular to the handle attachment 50, and with the side edges adjacent to other V-shaped teeth intersecting the side edges of the other V-shaped teeth forming V-shaped troughs between the V-shaped teeth. In this case, it can be seen that the side edges of the V-shaped teeth are at approximately 60° angles.

Looking now at the embodiment of FIG. 6, this embodiment is similar to the embodiment of FIGS. 4 and 5, but here outer end portions 54 of the tines 18 do not extend beyond outer tips 58 of the V-shaped teeth 60 forming elongated pointed members 62a–d. However, the side edges 56 are at greater angles to a plane perpendicular to the handle attachment 50; in this case they are greater than an angle of 70° (in one beneficial embodiment the angle is as much as 80°), and 70° has been found to be a particularly effective angle. By tapering the side edges 56 at greater angles, the lengths of the V-shaped teeth 60 are increased so that now the V-shaped teeth 60, which form the entire length of the elongated pointed members 62a–d again make up at least 30% of the total length of a scoop assembly 14d. Again, the elongated pointed members 62a–d are at least 5 inches long and could have a length up to 67% of the scoop assembly 14d. In one embodiment of the type shown here the tines have a length of 50% of the scoop assembly, which is particularly effective. Here the tines 48 add strength to the pointed members.

Figure 7:
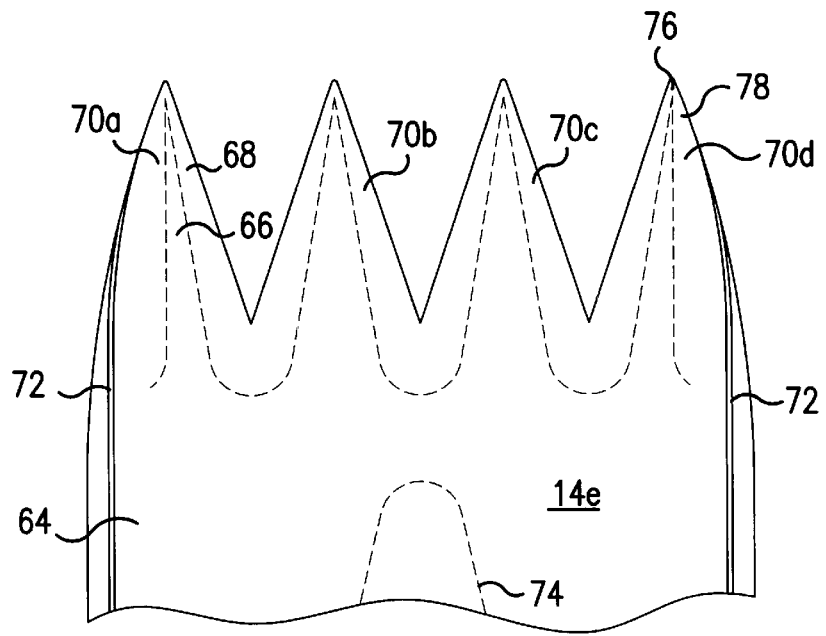
FIG. 7 is a plan view of a sixth embodiment of this invention.

The embodiment of FIG. 7 is somewhat similar to the embodiment of FIG. 3 in that there are no separate tines; rather, a scoop assembly 14e is formed only of sheet metal 64 which has V-shaped raised crimps 66 within each of the V-shaped teeth 68. In this case, the V-shaped teeth completely form elongated pointed members 70a–d. The sheet metal also forms a surrounding raised wall 72. The V-shaped crimps 66 and the surrounding raised wall 72 add strength to the scoop assembly 14e as does a center crimp 74. In a preferred embodiment the last ⅛–¼ inch. of a tip 76 is as flat as possible, the width being no more than ¼ inch if possible. Side edge portions 78 roll slightly downwardly, away from the crimp.

It should be understood by those of ordinary skill in the art of this invention that the V-shaped teeth formed in the sheet metal of the scoop of this invention so as to have side edges extending at angles of over 50° with a plane perpendicular to the elongated handle (or, stated another way, at angels less than 40° to the length of the elongated axes of the pointed members) and forming V-shaped troughs between the V-shaped teeth, promote insertion of the fiber shovel of this invention into a pile of fibrous material. Similarly, making the pointed members—formed of the V-shaped teeth and, in some embodiments, of tines extending from outer pointed tips of the V-shaped teeth—to be at least 5 inches long, also promotes insertion of the fiber shovel into a pile of fibrous material. In this regard, this structure of the elongated pointed members causes the fiber shovel to act somewhat in the manner of a pitchfork when it is inserted into fibrous material. Similarly, making the pointed members to be not less than 30% (or around ⅓) of the total length of the scoop assembly in the direction of the elongated handle also promotes pitchfork-like use.

However, by limiting the length of the elongated pointed members to not being greater than 67% of the length of the scoop assembly, the scoop is of a sufficient size to hold a substantial amount of smaller material which would otherwise fall between tines of the pointed members.

Although this invention has been described by using specific embodiments, it should be understood by those of ordinary skill in the art that the invention can be made in other ways and that the various features of the embodiments could be combined in different manners within the scope of the invention. In one embodiment there are only 3 elongated pointed members and in another there are 5 elongated pointed members. In one embodiment it has been found beneficial for the pointed members not to be less than 40% of the total length of the scoop assembly, and in another embodiment it has proven to be beneficial for it to not be less than 45% of the total length of the scoop assembly. In one embodiment the sheet metal forming the scoop is aluminum and in another it is steel. In one embodiment it is preferable for the side edges of the V-shaped teeth to extend at angles less than 80° to a plane perpendicular to the elongated handle because otherwise it does not have sufficient web for holding small materials and it does not have sufficient strength and durability. In one embodiment the breadth dimensions of the scoop assembly are 14 in.×14 in., but in another embodiment they are 16 in.×16 in. The dimensions could be varied, within the scope of the invention, also keeping in mind that the number of pointed members can also be varied.

I claim:

1. A fiber shovel for shoveling fibrous material, said fiber shovel comprising:

an elongated handle having a handgrip end and a scoop end;

a scoop assembly comprising a scoop formed of a sheet of metal;

an attaching member at a back end of the scoop for attaching the scoop assembly to the scoop end of said elongated handle;

said scoop assembly further including a plurality of elongated pointed members attached to a forward end of said scoop, opposite said back end of said scoop, said pointed members including V-shaped teeth formed in said sheet metal of said scoop, each of said V-shaped teeth having side edges extending at angles greater than 50° to a plane perpendicular to the elongated handle, with side edges adjacent to other V-shaped teeth intersecting the side edges of the other adjacent V-shaped teeth forming V-shaped troughs between the V-shaped teeth;

wherein a length of each pointed member from its outer tip to the adjacent troughs of its V-shaped tooth is at least 5 inches; and wherein the length of each pointed member is not less than 30% nor not more than 67% of the total length of the scoop assembly in the direction of the elongated handle;

wherein each V-shaped tooth includes a crimp in the sheet metal thereof;

wherein the crimps are V-shaped with the points of the crimped Vs being aligned with, and directed in the same direction as, the outer tips of the V-shaped teeth;

wherein there are at least four elongated pointed members; and wherein each elongated pointed member includes a tine extending outwardly from an outer tip of the V-shaped tooth.

2. The fiber shovel of claim 1, wherein the pointed members are at least 6 inches long.

3. The fiber shovel of claim 1, wherein said V-shaped teeth have side edges extending at angles of over 60° with a plane perpendicular to the elongated handle.

4. The fiber shovel of claim 1, wherein the lengths of the pointed members are not less than 40% of the total length of the scoop assembly.

5. The fiber shovel of claim 1, wherein the lengths of the pointed members are not less than 45% of the total length of the scoop assembly.

6. The fiber shovel of claim 1, wherein the side edges of the V-shaped teeth extend at angles of around 70° to a plane perpendicular to the elongated handle.

7. The fiber shovel of claim 1, wherein the side edges of the V-shaped teeth extend at angles of not greater than 80° to a plane perpendicular to the elongated handle.

8. The fiber shovel of claim 1, wherein the length of each pointed member is around 50% of the total length of the scoop assembly.

9. A fiber shovel for shoveling fibrous material, said fiber shovel comprising:

an elongated handle having a handgrip end and a scoop end;

a scoop assembly comprising a scoop formed of a sheet of metal;

an attaching member at a back end of the scoop for attaching the scoop assembly to the scoop end of said elongated handle;

said scoop assembly further including a plurality of elongated pointed members attached to a forward end of said scoop, opposite said back end of said scoop, said pointed members including V-shaped teeth formed in said sheet metal of said scoop, each of said V-shaped teeth having side edges extending at angles greater than 50° to a plane perpendicular to the elongated handle, with side edges adjacent to other V-shaped teeth intersecting the side edges of the other adjacent V-shaped teeth forming V-shaped troughs between the V-shaped teeth;

wherein a length of each pointed member from its outer tip to the adjacent troughs of its V-shaped tooth is at least 5 inches;

wherein the length of each pointed member is not less than 30% nor not more than 67% of the total length of the scoop assembly in the direction of the elongated handle; and wherein each elongated pointed member includes a tine extending outwardly from an outer tip of the V-shaped tooth.

10. The fiber shovel of claim 9, wherein the pointed members are at least 6 inches long.

11. The fiber shovel of claim 9, wherein there are at least four elongated pointed members.

12. A fiber shovel for shoveling fibrous material, said fiber shovel comprising:

an elongated handle having a handgrip end and a scoop end;

a scoop assembly comprising a scoop formed of a sheet of metal;

an attaching member at a back end of the scoop for attaching the scoop assembly to the scoop end of said elongated handle;

said scoop assembly further including a plurality of elongated pointed members attached to a forward end of said scoop, opposite said back end of said scoop, said pointed members including V-shaped teeth formed in said sheet metal of said scoop, each of said V-shaped teeth having side edges extending at angles greater than 50° to a plane perpendicular to the elongated handle, with side edges adjacent to other V-shaped teeth intersecting the side edges of the other adjacent V-shaped teeth forming V-shaped troughs between the V-shaped teeth;

wherein a length of each pointed member from its outer tip to the adjacent troughs of its V-shaped tooth is at least 5 inches; and wherein the length of each pointed member is not less than 30% nor not more than 67% of the total length of the scoop assembly in the direction of the elongated handle;

wherein each V-shaped tooth includes a crimp in the sheet metal thereof;

wherein each crimp extends from its tooth a substantial distance into the scoop.

13. The fiber shovel of claim 12, wherein at least two of said crimps run together in said scoop.

* * * * *